(12) United States Patent
Baehrle-Miller et al.

(10) Patent No.: US 10,466,734 B2
(45) Date of Patent: Nov. 5, 2019

(54) METHOD AND DEVICE FOR OPERATING A BRAKING DEVICE, BRAKING DEVICE

(71) Applicant: Robert Bosch GmbH, Stuttgart (DE)

(72) Inventors: Frank Baehrle-Miller, Schoenaich (DE); Ullrich Sussek, Oberstenfeld (DE); Simon Fleischer, Heilbronn-Boeckingen (DE); Peter Blessing, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/880,525

(22) Filed: Oct. 12, 2015

(65) Prior Publication Data

US 2016/0103430 A1 Apr. 14, 2016

(30) Foreign Application Priority Data

Oct. 14, 2014 (DE) .................. 10 2014 220 793

(51) Int. Cl.
| | |
|---|---|
| *G05B 11/01* | (2006.01) |
| *G05G 5/00* | (2006.01) |
| *F16D 65/18* | (2006.01) |
| *F16D 71/00* | (2006.01) |
| *H02P 23/14* | (2006.01) |
| *F16D 55/226* | (2006.01) |
| *F16D 121/24* | (2012.01) |

(52) U.S. Cl.
CPC .............. *G05G 5/00* (2013.01); *F16D 55/226* (2013.01); *F16D 65/18* (2013.01); *F16D 71/00* (2013.01); *H02P 23/14* (2013.01); *F16D 2121/24* (2013.01)

(58) Field of Classification Search
CPC ....... G05B 11/01; F16D 55/226; F16D 65/18; F16D 71/00; G05G 5/00; H02P 23/14
See application file for complete search history.

(56) References Cited

U.S. PATENT DOCUMENTS

| | | | | |
|---|---|---|---|---|
| 2013/0001027 | A1* | 1/2013 | Baehrle-Miller | ....... F16D 65/18 188/106 F |
| 2015/0066324 | A1* | 3/2015 | Baehrle-Miller | ..... B60T 13/662 701/70 |
| 2015/0136543 | A1* | 5/2015 | Selles | ..................... B64C 25/44 188/162 |

FOREIGN PATENT DOCUMENTS

| | | |
|---|---|---|
| CN | 1898110 A | 1/2007 |
| CN | 103648863 A | 3/2014 |
| DE | 197 32 168 C1 | 1/1999 |
| DE | 102012205576 | * 10/2013 |
| JP | 2014-69739 A | 4/2014 |
| WO | 2013/149743 A1 | 10/2013 |

* cited by examiner

*Primary Examiner* — Vishal R Sahni

(74) *Attorney, Agent, or Firm* — Maginot, Moore & Beck LLP

(57) ABSTRACT

The disclosure relates to a method for operating a braking device, in particular a parking brake device, which comprises an actuator having an electric motor that displaces an actuator element as desired into a brake application position or into a brake release position, wherein the electric motor is controlled in dependence upon a motor constant and an electrical resistance of the electric motor, characterized in that as the actuator element is displaced a prevailing motor input voltage and a prevailing motor current are ascertained, and that the motor constant and the electrical resistance are determined in dependence upon the ascertained motor input voltage and the ascertained motor current.

9 Claims, 2 Drawing Sheets

METHOD AND DEVICE FOR OPERATING A BRAKING DEVICE, BRAKING DEVICE

This application claims priority under 35 U.S.C. § 119 to application no. DE 10 2014 220 793.2, filed on Oct. 14, 2014 in Germany, the disclosure of which is incorporated herein by reference in its entirety.

BACKGROUND

The disclosure relates to a method for operating a braking device, in particular a parking brake device, which comprises an actuator having an electric motor that displaces an actuator element as desired into a brake application position or into a brake release position, wherein the electric motor is controlled in dependence upon a motor constant and an electrical resistance of the electric motor.

Moreover, the disclosure relates to a device for operating a braking device of this type having the features of the disclosure and a braking device having the features of the disclosure.

Methods and apparatuses and also braking devices of the type mentioned in the introduction are known from the prior art. Braking devices having an electrically motorized actuator are known by way of example from DE 197 32 168 C1. In order to operate the braking device, it is of importance that a defined brake application force is achieved with which the braking device is actuated. The term 'brake application force' is understood to mean the clamping force that is set between brake linings, which are influenced by a force by means of the actuator element, and a brake disc. Usually, a rotary movement of the electric motor is converted for this purpose by way of a gear spindle unit into a translatory movement of the actuator element. It is necessary during each procedure of controlling the electric motor so as to initiate a brake application procedure to first take up two no-load travel distances, namely the play that is always present at the start between the actuator element and possibly the brake piston that is to be displaced and pressed against the brake disc by means of the actuator element, and the play between the brake linings and the brake disc. A normal force, the so-called brake application force, is subsequently built up on the brake disc. This brake application force must achieve a defined minimum value under all specified operating conditions. However, for reasons of cost, the force is not measured directly.

Furthermore, it must be ensured for a brake release procedure that the actuator element is moved within a predetermined travel distance. It is necessary to ensure that also from the point of view of brake lining wear that after the completion of the brake release procedure no residual braking torque remains as a result of the travel distance being too short. Moreover, the distance travelled must not be too large, which—without a further calibrating measure—could result in an increased closing time period during the next subsequent brake application procedure. In order to determine the brake application force and the travel distance of the actuator element as accurately as possible, it is therefore known to ascertain typical motor parameters and in dependence thereon to control the electric motor. Typical motor parameters are in particular a motor constant of the electric motor and also the electrical resistance of the electric motor. With the knowledge of the motor parameters, in particular the motor constant, it is possible during a brake application procedure to determine or estimate the output torque of the electric motor (torque) and thus also the clamping force or brake application force in a sufficiently accurate manner. During the brake release procedure, in other words as the actuator element is displaced into its brake release position, it is possible with the knowledge of this information to accurately calculate the travel distance.

SUMMARY

The method in accordance with the disclosure has the advantage that the motor parameters, motor constant and electrical resistance are ascertained during the operation of the braking device so that it is also possible to take into consideration external boundary conditions, such as ambient temperature or the like. In accordance with the disclosure, it is provided for this purpose that as the actuator element is displaced a prevailing motor input voltage and a prevailing motor current are ascertained and that the motor constant and the electrical resistance are determined in dependence upon the ascertained motor input voltage and the ascertained motor current. After the point in time in which the actuator is controlled, a control device measures the motor current and the control device voltage, which corresponds to the motor input voltage, and calculates therefrom the said motor parameters. During the brake application procedure, the brake application force is calculated in an expedient manner from the motor parameter. During a brake release procedure, the travel distance of the actuator element is ascertained from the information relating to the current and voltage. In an advantageous manner, the motor current and the motor input voltage are ascertained during the brake application procedure in a specific phase of the brake application procedure.

It is particularly preferred that the motor input voltage and the motor current are ascertained in a periodic manner. For this purpose, the motor current and the motor input voltage are sampled with a predetermined frequency after a determinable discrete point in time, in particular during a brake application procedure.

In accordance with one advantageous further development of the disclosure, it is provided that the motor input voltage and the motor current are ascertained when the load torque is constant or almost constant. This is particularly the case if the actuator is located in a load-free actuating phase in which the prevailing load torque is produced in particular only from the actuating torque of the electric motor and a friction torque of the actuator. A load torque that is produced from the actuating torque of the electric motor and from the friction torque that is to overcome the movement of the actuator element is produced in particular at the commencement of an actuating procedure if the actuator element is displaced in order to overcome the previously mentioned play. The load torque is constant until the actuator element impinges upon the brake disc. However, it is also possible to use other actuating phases that have a constant load torque in which the motor current and the motor input voltage are ascertained in order to determine the motor constant and the electrical resistance. In particular, it is possible to provide that the motor current and the motor input voltage are ascertained in a phase that has a constant load torque if the braking device is released.

It is preferred that the motor input voltage and the motor current are ascertained during a brake application procedure when the load torque is constant or almost constant. This is particularly the case in the first phase of the brake application procedure when the electric motor starts up. By virtue of the fact that the load torque is constant or almost constant, the outlay involved in the calculation process is simplified and the motor parameters can be determined in a more rapid and resource-saving manner.

Furthermore, it is preferred that the motor input voltage and the motor current—as already previously mentioned—are ascertained in a switch-on phase, in other words in a first phase of the control procedure, in particular, because it is at this time that the load torque is constant or almost constant.

In accordance with one advantageous further development of the disclosure, it is provided that a procedure of controlling the electric motor is terminated in a switch-off phase when the electric motor has achieved a constant or almost constant rotational speed.

Moreover, it is preferably provided that the motor constant and the electrical resistance are determined in the switch-off phase.

Furthermore, it is preferably provided that the motor constant and the electrical resistance, in other words the typical motor parameters, are determined in dependence upon a voltage gradient, in particular in the switch-off phase.

The device in accordance with the disclosure may be characterized by a control device that implements the method in accordance with the disclosure. This produces the advantages already mentioned.

The braking system in accordance with the disclosure may be characterized by the device in accordance with the disclosure. This produces the advantages already mentioned. Further advantages and features are evident from the previous description.

BRIEF DESCRIPTION OF THE DRAWINGS

Exemplary embodiments of the disclosure are presented in the drawings an are explained in more detail in the description below.

In the drawings.

DETAILED DESCRIPTION

Figure 1:
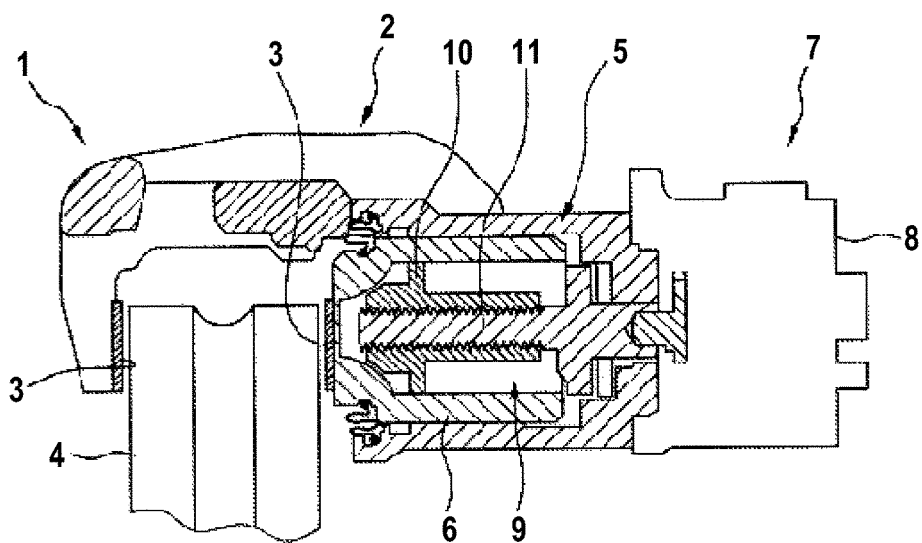
FIG. 1 illustrates a braking device of a motor vehicle having an integrated parking brake function in a simplified cross-sectional view.

FIG. 1 illustrates in a simplified cross-sectional view a braking device 1 of a motor vehicle not illustrated in the figure in detail. The braking device 1 is embodied as a disc brake and comprises for this purpose a brake caliper 2 that supports the brake linings 3 and between which it is possible to jam or clamp a brake disc 4 that is connected in a non-rotatable manner to a wheel of the motor vehicle. For this purpose, a hydraulic actuator 5 is allocated to the brake caliper 2 and said hydraulic actuator comprises a brake piston 6 that can be actuated in a hydraulic manner in order to clamp the brake disc 4 as required between the brake linings 3. As a consequence, a braking torque is applied during the driving operation to the brake disc 4 and thus to the wheels and said braking torque is used for the purpose of decelerating the vehicle.

Furthermore, the braking device 1 is embodied as a parking brake device or rather has a parking brake function and comprises for this purpose an electrically motorized actuator 7 that is formed by an electric motor 8, an actuating gear 9 that is embodied in this case as a spindle gear, and an actuator element 10. An output shaft of the electric motor 8 is connected in a non-rotatable manner to a drive spindle 11 of the actuator gear 9. The drive spindle 11 comprises an outer thread that cooperates with an inner thread of the actuator element 10 that can move along the drive spindle 11. By means of controlling the electric motor 8, the drive spindle 11 is consequently set into a rotational movement in order to displace the actuator element 10. The actuator element 10 can be displaced from a brake release position into a brake application position in which the actuator element 10 urges the brake piston 6 against the brake disc 4 and as a consequence applies force to the brake caliper 2. The actuator element 10 is arranged for this purpose in a coaxial manner with respect to the brake piston 6 and within the brake piston 6. The rotational movement of the drive spindle 11 is converted by means of the actuator gear 9 into a translatory movement of the actuator element 10. In this respect, the wheel brake device corresponds to known wheel brake devices. In order to be able to optimize the control of the electric motor 8 and the operation of the wheel brake device 1, motor parameters of the electric motor 8 are ascertained during the operation of the wheel brake device 1 and used to control the wheel brake device 1 in particular the actuator 7 in order by way of example to be able to estimate the clamping force as accurately as possible and to be able to calculate easily the travel distance of the actuator element 10, in particular during a brake release procedure.

The control device measures the motor current i(t) and the motor input voltage u(t), which corresponds to the control device voltage at its output, after the point in time in which the electric motor 8 is controlled. The control device calculates from these input values the typical motor parameters, motor constant and electrical resistance. The prevailing brake application force $F_C(t)$ is calculated from said parameters during a brake application procedure. The travel distance of the actuator element 10 is ascertained from the information relating to the current and voltage as the parking brake is being released. The said travel distance is presently advantageously ascertained in a specific phase of the brake application procedure.

Figure 2:
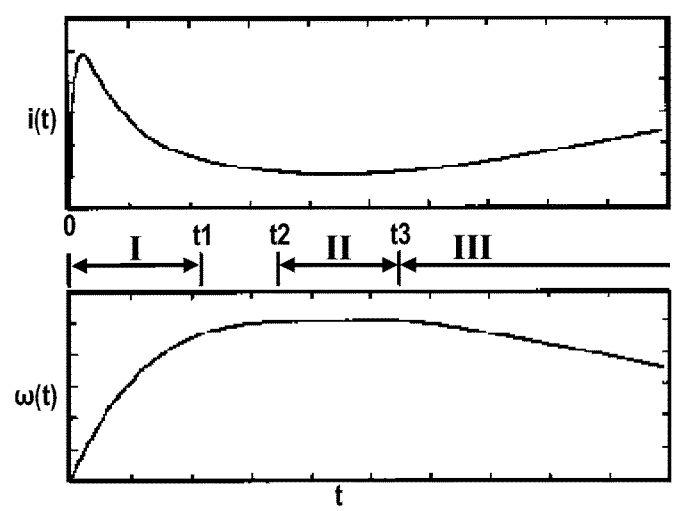
FIG. 2 illustrates a behavior of an electric motor of the braking device over time.

FIG. 2 illustrates in this regard in a diagram, plotted over the time t, the motor current and also a motor angular speed of the output shaft of the electric motor 8; said motor angular speed is to be correlated with the motor current. The progression with respect to time is divided into three phases I, II and III. In the first phase I, a higher switch-on current is available and the electric motor 8 accelerates out of the previous idling position. The subsequent phase II is characterized by an almost constant motor current and an almost constant angular speed that occur whilst taking up the play in the braking device 1. In this phase II, the play in the drive spindle prior to a brake application procedure and the free play of the brake linings 3 with respect to the brake disc 4 prior to coming to rest against a brake disc 4 are taken up. A resulting brake application force is applied to the brake disc 4 in the third phase III. The progression described and illustrated in FIG. 2 of the motor current and the motor angular speed is produced when the electric motor 8 is initially load free and is subsequently loaded with respect to a force/load after phase III. In an advantageous manner, the motor current and the motor input voltage is ascertained and evaluated in the first phase I. However, it is also feasible to use the method described hereinunder also during a brake release procedure, in other words whilst the actuator element 10 is being displaced from the brake application position into the brake release position, during the entire duration of the brake release procedure.

Figure 3:
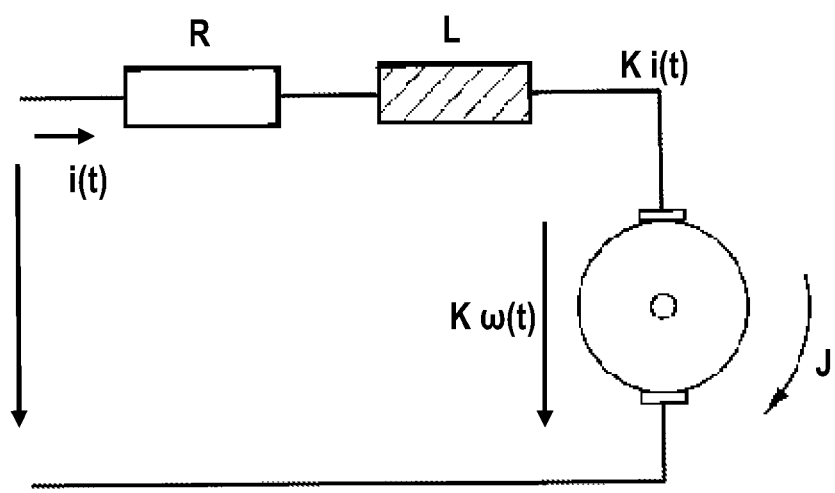
FIG. 3 illustrates a schematic view of the electric motor and FIG. 4 illustrates a simplified substitute circuit diagram of the electric motor.

The physical principles for performing the method are illustrated hereinunder. The description is based on the image of the structure of the electric motor 8 illustrated in FIG. 3. FIG. 3 illustrates for this purpose an electric motor 8, the resulting ohmic resistance R of the electric motor 8, a motor inductivity L and also a resulting inertia moment of the motor-gear unit. The mathematical model of the electrically motorized actuator is formulated by means of the following equations:

$$L\frac{di(t)}{dt} = -Ri(t) - K\omega(t) + u(t) \quad (1)$$

$$J\frac{d\omega(t)}{dt} = Ki(t) - M_L(t) \quad (2)$$

$$M_L(t) = M_F + M_C(t) \quad (3)$$

$$\frac{ds(t)}{dt} = \gamma\omega(t) \quad (4)$$

wherein i represents the motor current, ω represents the motor angular speed, u represents the motor input voltage, $M_L$ represents a load torque, $M_F$ represents a friction torque, $M_C$ represents an actuating torque at the motor output (drive torque), s represents the travel distance of the actuator element 10, K represents the motor constant and γ represents a constant for the purpose of converting the motor angular speed into the spindle speed of the drive spindle 11.

During the brake application procedure, the actuating torque $M_C$ that is present at the motor output and occurs in the equation (3) is proportional to the normal force that acts on the brake disc 4 of a wheel. With the knowledge of the motor constant K, it is possible using the equations (2) to (4) to ascertain the travel distance s(t) as the wheel braking device 1 is released.

The following differential equation is produced from the equations (1) to (3) and said differential equation illustrates the influence of the motor voltage u(t) and the load torque $M_L(t)$ on the motor current:

$$L \cdot \frac{d^2 i(t)}{dt^2} + R \cdot \frac{di(t)}{dt} + \frac{K^2}{J} \cdot i(t) = \frac{du(t)}{dt} + \frac{K}{J} \cdot M_L(t) \quad (5)$$

The transformation of the equation (5) into the Laplace space produces the following equation:

$$I(s) = \frac{\frac{1}{R} \cdot s}{\frac{L}{R} \cdot s^2 + s + \frac{K^2}{J \cdot R}} \cdot U(s) + \frac{\frac{K}{J \cdot R}}{\frac{L}{R} \cdot s^2 + s + \frac{K^2}{J \cdot R}} \cdot M_L(s) \quad (6)$$

The equations (5) and (6) form the basis of the different methods that are illustrated hereinunder and are used to determine the motor parameters.

The temperature-dependent parameters that are relevant for estimating the clamping force, said parameters being namely the motor constant K and the resulting ohmic resistance R, are determined during a brake application procedure in Phase 1. In this phase, $M_C=0$ applies for the actuating torque.

Consequently, in accordance with equation (3), the load torque $M_L$ comprises only the friction torque $M_F$. Two methods of different types for determining the motor parameters are illustrated below. These two methods are described as variant A or as variant B.

In variant A, the two measurement signals, motor current i(t) and the motor input voltage u(t) are ascertained initially at equally spaced time intervals using the sample time $T_A$ so that time-discrete signal values u(n) and i(n) are obtained. This renders it possible to formulate the following recursive differential equation:

$$i(n) = \gamma_1 i(n-1) + \gamma_2 i(n-2) + \alpha_1 \cdot u(n-1) + \alpha_2 \cdot u(n-2) + \beta_1 M_L(n-1) + \beta_2 M_L(n-2) \quad (7)$$

The coefficients that occur in the recursive differential equation are in each case constants that are dependent upon the motor parameters. Since the friction torque of the electro-motorized actuator 7 has a constant but unknown value $M_{F0}$ in phase I, the following is produced from equation (7):

$$\Delta u(n-1) = u(n-1) - u(n-2) \quad (8)$$

The differential equation:

$$i(n) = \gamma_1 i(n-1) + \gamma_2 i(n-2) + \gamma_3 \cdot \Delta u(n-1) + \gamma_4 \quad (9)$$

It is possible after introducing the electrical or mechanical time constants of the system to calculate the coefficients γ1 to γ4 that occur in said differential equation:

$$T_{el} = \frac{L}{R} \quad (10)$$

$$T_{mech} = \frac{JR}{K^2} \quad (11)$$

and the two poles of the system transmission behavior:

$$p_{1,2} = -\frac{1}{T_{el}} \left\{ \frac{1}{2} \pm \sqrt{\frac{1}{4} - \frac{T_{el}}{T_{mech}}} \right\} \quad (12)$$

as follows:

$$\gamma_1 = e^{p_1 \cdot T_A} + e^{p_2 \cdot T_A} \quad (13)$$

$$\gamma_2 = e^{-\frac{1}{T_{el}} \cdot T_A} \quad (14)$$

$$\gamma_3 = \frac{1}{2 \cdot L \cdot \sqrt{\frac{1}{4 \cdot T_{el}^2} - \frac{1}{T_{el} \cdot T_{mech}}}} \cdot (e^{p_1 \cdot T_A} - e^{p_2 \cdot T_A}) \quad (15)$$

$$\gamma_4 = \left( e^{-\frac{1}{T_{el}} \cdot T_A} - (e^{p_1 \cdot T_A} + e^{p_2 \cdot T_A}) + 1 \right) \cdot \frac{M_{F0}}{K} \quad (16)$$

The number of unknown parameters is now described by r. In the case of the variant being considered in this case r=4. In order to make the following calculation easier to understand, the unknown coefficients λ1 to λ4 are combined to form the parameter vector:

$$\gamma = [\gamma_1 \gamma_2 \gamma_3 \gamma_4]^T \quad (17)$$

An equation system is produced by formulating the equation (9) for different discrete points in time n and the parameter vector γ can be determined from said equation system. The method for determining the parameters is further explained below. Only the coefficients γ1 and γ2 are required for the following calculation of the two motor parameters K and R. The motor parameters are produced from:

$$K = \sqrt{\left\{-\left(\frac{arcosh\left(\frac{\gamma_1}{2\cdot\sqrt{\gamma_2}}\right)}{T_A}\right)^2 - \frac{1}{4\cdot T_{el}^2}\right\}\cdot J \cdot L} \quad (18)$$

$$R = \frac{-L\cdot \ln(\gamma_2)}{T_A} \quad (19)$$

In the case of the variant B, a simplified estimation of the motor parameters is achieved by ignoring the drop in voltage that occurs at the inductance of the armature winding. During this assumption, the equations (5) and (6) produce the equations:

$$R\cdot \frac{di(t)}{dt} + \frac{K^2}{J}\cdot i(t) = \frac{du(t)}{dt} + \frac{K}{J}\cdot M_L(t) \quad (20)$$

$$I(s) = \frac{\frac{1}{R}\cdot s}{s + \frac{K^2}{J\cdot R}}\cdot U(s) + \frac{\frac{K}{J\cdot R}}{s + \frac{K^2}{J\cdot R}}\cdot M_L(s) \quad (21)$$

The associated time-discrete differential equation of the system corresponding to the equation (9) is as follows:

$$i(n) = \gamma_1 \cdot i(n-1) + \gamma_2 \cdot \Delta u(n-1) + \gamma_3 \quad (22)$$

with:

$$\gamma_1 = e^{-\frac{K^2}{J\cdot R}T_A} \quad (23)$$

$$\gamma_2 = \frac{1}{R} \quad (24)$$

$$\gamma_3 = \frac{1}{K}\cdot\left(1 - e^{-\frac{K^2}{J\cdot R}T_A}\right)\cdot M_{F0} \quad (25)$$

wherein $M_{F0}$ describes in turn the friction torque that is assumed to be constant in phase I of the closing procedure. The number of unknown coefficients in this case is r=3. For further calculation, the coefficients γ1 to γ3 are combined to form the r-dimensional parameter vector:

$$\gamma = [\gamma_1 \gamma_2 \gamma_3]^T \quad (26)$$

The two motor parameters K and R are determined in the two following equations:

$$K = \sqrt{-\frac{\ln(\gamma_1)\cdot J}{\gamma_2 \cdot T_A}} \quad (27)$$

$$R = \frac{1}{\gamma_2} \quad (28)$$

Only the two coefficients γ1 and γ2 are required for this purpose.

In contrast to the brake application procedure, the brake release procedure, in other words whilst displacing the actuator element 10 into the brake release position, does not have a phase in which a constant load torque $M_L$ can be estimated. Nonetheless, the fundamentally same procedure for calculating the motor parameter, motor constant and resistance is also available here. However, in the estimation equation (9) of the variant A, the parameter γ4 is now a function of the variable load $M_L$ and can therefore assume a different value during each sampling step. The same applies for the parameter γ3 in the equation (22).

Initially, the data i(1) to i(N) or Δu(2) to Δu(N) that are previously measured in successive discrete sampling points in time are available after a predetermined discrete point in time N in phase I of the state procedure. In order to maintain as small as possible the influence of the errors that are constantly contained in the measurement variables, the value of N is preferably selected to be essentially greater than the estimated parameters that contain the number of the parameters vector γ. The estimated value for the parameter vector γ is described hereinunder by $\hat{\gamma}$:

$$\hat{\gamma} = [S^T\cdot S]^{-1} S^T\cdot b \quad (29)$$

wherein b describes a current vector and S characterizes a data matrix. For the variant A, these two variables are defined as follows for the purpose of estimating the parameter vector γ that is illustrated in the equation (17):

$$b = [i(3)\ i(4)\ \ldots\ i(N)]^T \quad (30)$$

$$S = \begin{bmatrix} i(2) & i(1) & \Delta u(2) & 1 \\ i(3) & i(2) & \Delta u(3) & 1 \\ \vdots & \vdots & \vdots & \vdots \\ i(N-1) & i(N-2) & \Delta u(N-1) & 1 \end{bmatrix} \quad (31)$$

For the variant B, for the purpose of estimating the parameter vector γ in accordance with the equation (26) in the simplified differential equation, b and S have the following structure:

$$b = [i(2)\ i(3)\ i(N)]^T \quad (32)$$

$$S = \begin{bmatrix} i(1) & \Delta u(2) & 1 \\ i(2) & \Delta u(3) & 1 \\ \vdots & \vdots & \vdots \\ i(N-1) & \Delta u(N) & 1 \end{bmatrix} \quad (33)$$

The solution of the equation (29) for the purpose of estimating parameters requires a greater amount of storage space and necessitates a matrix-inversion. In the case of a real-time application, this estimation method leads to a high demand being placed on the capacity of the computer system that is being used. Moreover, this method requires constant values for all components of the parameter vector that is to be estimated. This method is therefore preferably only implemented for the brake application procedure.

One advantageous achievement for determining the parameter γ is provided by a recursive estimation method. This method also renders possible an application in the case of components of the parameter vector that change over time. As a result, said method can be used in addition to determining parameters during the brake application procedure but also for the estimation procedure during the brake release procedure.

In the case of this recursive method, the procedure of estimating the parameter vector γ is repeated in each case by way of example at each discrete point in time n in a predetermined time interval. The result of this estimation is described by $\hat{\gamma}(n)$. In the case of this method, the estimated value is produced at the point in time n+1 for the parameter vector, in other words $\hat{\gamma}(n+1)$, from the estimated value $\hat{\gamma}(n)$ during the previous sampling step and an additive term that can be described as a product between a q-dimensional correction vector $\beta(n+1)$ and an estimation error $e(n+1)$ in accordance with:

$$\hat{\gamma}(n+1)=\hat{\gamma}(n)+\beta(n+1)\cdot e(n+1) \tag{34}$$

The estimation error is calculated from the difference between the most recent estimated current value and the prediction of the current measurement, said prediction being formed from earlier measured data:

$$e(n+1)=i(n+1)-\Psi^T(n+1)\cdot\hat{\gamma}(n) \tag{35}$$

In the case of the variant A, the data vector $\Psi^T(n+1)$ in this equation has the following structure for the purpose of estimating the vector $\hat{\lambda}(n+1)$ in accordance with equation (17):

$$\Psi^T(n+1)=[i(n)\,i(n-1)\,\Delta u(n)\,1] \tag{36}$$

In the case of the variant B, the data vector $\Psi^T(n+1)$ for estimating the vector $\hat{\gamma}(n+1)$ in accordance with equation (26) is produced from:

$$\Psi^T(n+1)=[i(n)\,\Delta u(n+1)\,1] \tag{37}$$

The r-dimensional correction vector $\beta(n+1)$ that occurs in equation (34) is calculated using:

$$\beta(n+1)=\frac{P(n)\cdot\Psi(n+1)}{1+\Psi(n+1)^T\cdot P(n)\cdot\Psi(n+1)} \tag{38}$$

wherein P(n) characterizes a symmetrical r-dimensional covariance matrix that is ascertained using the unit matrix I in a recursive manner in accordance with the following equation:

$$P(n+1)=[1-\beta(n+1)\cdot\Psi(n+1)^T]\cdot P(n)+Q \tag{39}$$

Start values $\hat{\gamma}$ and P(0) are required for the purpose of initializing the recursive equation (34) and (39). An advantageous spread of start values is produced if the two components $\hat{\gamma}_1(0)$ and $\hat{\gamma}_2(0)$ are assigned nominal values of the motor parameters R and K. This occurs in the case of variant A by means of the equations (13) and (14) or in the case of variant B using the equations (23) and (24). The convergence behavior of the parameter estimation $\hat{\gamma}(n+1)$ within the recursive algorithm is influenced by means of the symmetrical r-dimensional design matrix Q in equation (38). This is achieved in an advantageous manner when using a diagonal matrix with the diagonal elements $q_{11}\geq 0\ldots q_{nn}\geq 0$. The convergence of the components $\hat{\gamma}_i(n)$ of the parameter vector $\hat{\gamma}(n)$ can be directly influenced by means of each diagonal element $q_{ii}$. It has proven to be advantageous to adjust the diagonal elements during the process of evaluating the measurement data. The convergence of the allocated components of the estimation vector can be improved by means of a diagonal element having a high value. It is possible during the time interval in which the physical variable that is associated with an estimation component is slightly excited or changed for the associated diagonal element to be parameterized with a value. In contrast, in intervals in which the associated components of $\hat{\gamma}$ are greatly excited or undergo a large change, the diagonal element can be adapted to become a large value. In the case of estimating parameters during the brake release procedure, owing to the variable torque $M_c$ in particular the component $\gamma_r$ is time-changeable in the parameter vector $\gamma$. For this case, the diagonal element $q_n$ should therefore be parameterized in the design matrix Q with a large value relative to the other diagonal elements of this matrix.

Since all the illustrated variants of the described method involve the motor input voltage u or the voltage gradient $\Delta u$ in the estimation equations, the method is also particularly suitable in the case of fluctuations in the on-board supply voltage that always occur in motor vehicle applications. In the present case, the method was illustrated using the example of phase I during the brake application procedure of the automated parking brake or braking device 1. As a consequence, it is possible using the estimated values for the motor parameters K and R to ensure that the level of force required during the brake application procedure is achieved at the brake disc. The illustrated methods can also be used accordingly during the procedure of releasing the parking brake. It is possible by virtue of evaluating the current and voltage data to ascertain the changes in K and R that occur in the preceding time period with a closed parking brake. As a consequence, it is possible by means of the estimated parameters to maintain a defined brake release travel distance with which on the one hand a brake release travel distance that is too short that would lead to a residual braking force is avoided, and on the other hand a brake release travel distance that is too long that would result in a delayed response time during the next brake application procedure is avoided.

The method thus offers the opportunity of estimating in real time the motor constants K and the resulting resistance R of the electric motor 8 by means of evaluating the periodically ascertained data of the motor input voltage u and of the motor current i. The method is achieved in two steps, wherein in a first step the coefficients of a linear differential equation are estimated and in the second step the parameters K and R are calculated from these coefficients.

Variant A is suitable for systems that have a not insignificant product Ldi/dt. The estimation equation comprises four coefficients. Two coefficients are linked to current values that follow one another successively, one coefficient is a factor before a voltage gradient and one coefficient is proportional to a friction torque. For the purpose of calculating the parameters that are to be determined, only the two parameters that are allocated to the current are required. Variant B is suitable in particular for systems that have an insignificant product Ldi/dt. The resulting simplified estimation equation has three coefficients. One coefficient is linked to the current values, one coefficient is a factor before a voltage gradient and a further coefficient is proportional to the friction moment. For the purpose of calculating the motor parameters that are to be determined, only the parameters that are linked to the current and to the voltage gradient are required.

For the purpose of determining the two motor parameters K and R, a linear equation system can be initiated that also performs a matrix inversion. The method minimizes the sum of the squares of the errors that occur as a result of the measurement values that are encumbered by errors.

One advantageous embodiment is achieved by virtue of using a recursive estimation method according to the equations (34) to (39). The sampled measurement values of the current signals and voltage signals are inserted into a data vector. By virtue of suitably dimensioning the diagonal elements in the design matrix Q, the convergence of the estimation of the components of the parameter vectors can be changed. In particular, these elements can also be changed in the phase of the estimation procedure for the parameter vector is estimated in order thus to change the convergence of specific components of the parameter vector. By way of example, time intervals that have large changes in the motor input voltage occur during the brake application procedure in phase I. In particular, the convergence of the allocated components of γ are to be forced by means of large values of the corresponding diagonal elements at times in which current signals or voltage signals that are used in the data vector are greatly excited or changed. When determining the parameters in the brake release procedure, it is possible to take into consideration in the estimation equation the influence that changes over time of the load torque.

In the second step, the coefficients that are estimated in the first step are used to ascertain the motor parameters K and R. Particularly suitable for this purpose are efficient iterative algorithms in the microcontroller-computers that are used. It is possible using said microcontroller-computers to also calculate the motor parameters in real time the non-linear equation using divisions, multiplications and trigonometrical functions.

Determining motor parameters with the aid of blanking intervals.

Furthermore, a force value or a value of the clamping force is estimated by virtue of evaluating the voltage progression of the electric motor 8 during so-called idling phases. As previously described, it is possible in the start-up phase to calculate the motor resistance R and the motor constant K in the phase I. If interruptions in the voltage occur during this start-up phase, then said interruptions must be detected and compensated for. The introduction of (Hall)-sensorless systems has created a standard that explicitly renders it possible for the electric motor 8 to run in an idle mode, unbraked and without a voltage during the control procedure. These blanking intervals during the no-load, idling phase of the electric motor 8 render it possible to further determine or reinforce the motor parameters, wherein it is achieved that an on-board voltage supply of the motor vehicle that is fitted with the braking device 1 becomes greatly insensitive to voltage fluctuations.

Figure 4:
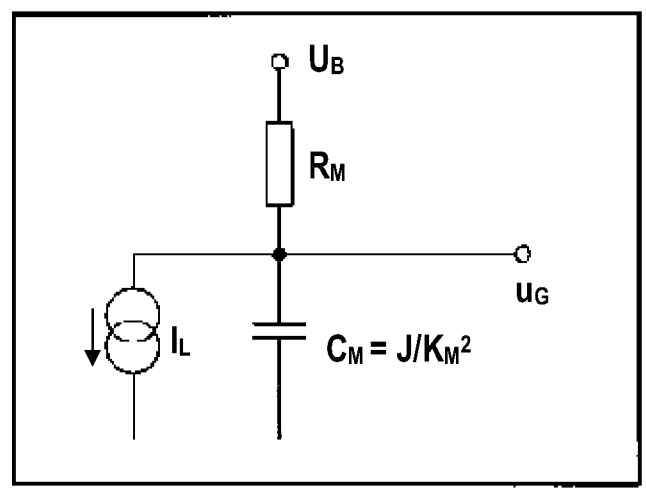

If the electric motor 8 is switched off after the switch-on peak (phase I) in the no-load idling phase without an electric brake, then the progression of the regenerative voltage is only determined by means of the constant friction torque of the motor/gear unit. FIG. 4 illustrates the simplified substitute diagram of the electric motor 8 with a constant load.

$U_B$ represents the operating voltage, $I_L$ the idling current produced as a result of the load torque, J represents the mass inertia of the armature and $u_G$ represents the regenerative voltage that is induced by means of the electric motor 8 that continues to rotate. In order to use the methods, it is necessary to measure the constant idling current prior to and after the voltage is switched off. This is the case if the measured current i no longer changes after the switch-on peak. The rotational speed is now constant and the substitute capacitor $C_M$ is charged. Although no real current is still flowing after the voltage has been switched off, virtual current is still available in the substitute circuit diagram $I_L$ as long as the substitute capacitor is still charged. Since the friction torque is constant, the idling current is also constant and the regenerative voltage reduces in a linear manner. The following equation is produced according to the current/voltage law at the capacitor:

$$u_G = \frac{1}{c_M} \cdot \int I_L dt \quad \frac{du_G}{dt} = \frac{1}{c_M} \cdot I_L \quad (40)$$

The following calculation is possible in the control device for the duration of the blanking periods T:

$$\frac{\Delta u}{T} = \frac{K_M^2}{J} \cdot I_L \quad K_M = \sqrt{\frac{J}{I_L} \cdot \frac{\Delta u}{T}} \quad (41)$$

It is assumed that the mass inertia moment J is known. Therefore, it is only necessary to measure the gradient of the motor voltage u during the blanking intervals. For the purpose of calculating $R_M$, it is sufficient to measure the motor voltage and directly after the operating voltage is switched off. This voltage difference is also to be calculated here as Δu. Thus, the following is produced directly for $R_M$:

$$R_M = \frac{\Delta u}{I_L} \quad (42)$$

The parameters relating to the motor constant $K_M$ and electrical resistance R of the electric motor 8 are thus calculated on the basis of current values and voltage values, and the motor control is switched off only if the electric motor 8 has achieved a constant final rotational speed. The calculation is performed with reference to the evaluation of the voltage gradient Δu during the switch-off phase.

What is claimed is:

1. A method for operating a parking brake device, the parking brake device including an actuator having an electric motor configured to displace an actuator element between a brake application position and a brake release position, the method comprising:
    ascertaining a motor input voltage and a motor current as the actuator element is displaced;
    determining a motor constant of the electric motor and an electrical resistance of the electric motor based on the ascertained motor input voltage and the ascertained motor current; and
    controlling the electric motor based on the determined motor constant and the determined electrical resistance,
    wherein the ascertaining of the motor input voltage and the motor current further comprises measuring the motor input voltage and the motor current during a switch-on phase of the parking brake device.

2. The method according to claim 1, the ascertaining of the motor input voltage and the motor current further comprising:
    periodically measuring the motor input voltage and the motor current as the actuator element is displaced.

3. The method according to claim 1, the ascertaining of the motor input voltage and the motor current further comprising:
    measuring the motor input voltage and the motor current while the electric motor has at least one of (i) an constant torque and (ii) a near constant torque.

4. The method according to claim 3, the ascertaining of the motor input voltage and the motor current further comprising:
    measuring the motor input voltage and the motor current during a brake application procedure.

5. The method according to claim 1, further comprising:
    initiating a switch-off phase of the parking brake device in which the controlling of the electric motor is terminated in response to the electric motor having at least one of (i) a constant rotational speed and (ii) a near constant rotational speed.

6. The method according to claim 5, the determining of the motor constant and an electrical resistance further comprising:
   determining the motor constant and the electrical resistance during the switch-off phase.

7. The method according to claim 5, the determining of the motor constant and an electrical resistance further comprising:
   determining the motor constant and the electrical resistance based on a voltage gradient during the switch-off phase.

8. A device for operating an operating a parking brake device of a vehicle, the parking brake device including an actuator having an electric motor configured to displace an actuator element between a brake application position and a brake release position, the device comprising:
   a control device configured to (i) measure a motor input voltage and a motor current as the actuator element is displaced, (ii) determine a motor constant of the electric motor and an electrical resistance of the electric motor based on the ascertained motor input voltage and the ascertained motor current, and (iii) control the electric motor based on the determined motor constant and the determined electrical resistance,
wherein the motor input voltage and the motor current are measured during a switch-on phase of the parking brake device.

9. A parking brake device comprising:
an actuator element;
an actuator having an electric motor configured to displace the actuator element between a brake application position and a brake release position; and
a control device configured to (i) measure a motor input voltage and a motor current as the actuator element is displaced, (ii) determine a motor constant of the electric motor and an electrical resistance of the electric motor based on the ascertained motor input voltage and the ascertained motor current, and (iii) control the electric motor based on the determined motor constant and the determined electrical resistance,
wherein the motor input voltage and the motor current are measured during a switch-on phase of the parking brake device.

* * * * *